United States Patent Office 2,926,201
Patented Feb. 23, 1960

2,926,201

SIDE-CHAIN CHLORINATION OF ETHYLPOLY-CHLOROBENZENES

Robert R. Dreisbach and Roger F. Monroe, Midland, Mich., assignors to The Dow Chemical Company, Midland, Mich., a corporation of Delaware No Drawing. Application June 11, 1957
Serial No. 664,912

8 Claims. (Cl. 260—651)

This invention pertains to the chlorination of the ethyl side-chain of ethylpolychlorobenzenes, especially ethyl dichlorobenzenes and ethyltrichlorobenzenes. It particularly concerns an improved method wherein the chlorination is carried out in the presence of adsorbent carbon, thereby forming the corresponding monochloroethyl- and $\alpha,\beta$-dichloroethylpolychlorobenzene products and preventing the formation of $\beta,\beta$-dichloroethylpolychlorobenzene by-products.

When the ethyl side-chain of ethylpolychlorobenzenes such as ethyldichlorobenzenes or ethyltrichlorobenzenes is chlorinated in accordance with the well-known art, e.g. by passing chlorine gas into a body of the liquid ethylpolychlorobenzenes in the presence of phosphorus chlorides or while irradiated with ultraviolet light, the resulting reaction product comprises a mixture of chlorinated products, e.g. $\alpha$-chloroethyl-, $\beta$-chloroethyl-, $\alpha,\beta$-dichloroethyl-, and $\beta,\beta$-dichloroethyl-polychlorobenzenes and higher chlorinated products.

Of the side-chain-chlorinated ethylpolychlorobenzene products just named, the first three kinds are useful materials, e.g. for the formation of polychlorostyrenes by the dehydrochlorination of $\alpha$- or $\beta$-chloroethylpolychlorobenzenes or by the dechlorination of $\alpha,\beta$-dichloroethylpolychlorobenzenes. For such purposes, the presence of $\beta,\beta$-dichloroethylpolychlorobenzenes is objectionable and often deleterious. For instance, in the dechlorination of $\alpha,\beta$-dichloroethyldichlorobenzenes by reaction thereof with metallic zinc to make dichlorostyrenes, the presence of the $\beta,\beta$-dichloroethyldichlorobenzene isomers in the starting material seriously impedes and sometimes prevents occurrence of the reaction. When $\alpha$- or $\beta$-chloroethylpolychlorobenzenes containing $\beta,\beta$-dichloroethyl-polychlorobenzenes are dehydrochlorinated, e.g. with alkali, the resulting polychlorostyrenes also contain $\beta$-chlorovinylpolychlorobenzenes which deleteriously contaminate the styrene product, interfere with its polymerization and degrade its properties.

It is an object of this invention to provide an improved method for the chlorination of the ethyl side-chain of ethylpolychlorobenzenes wherein the formation of $\beta,\beta$-dichloroethylpolychlorobenzenes is minimized or prevented.

A particular object is to provide such a method for the chlorination of the ethyl side-chain of ethyldichlorobenzenes and ethyltrichlorobenzenes.

Other objects and advantages of the invention are evident in the following description.

The objects of this invention are attained in an improved method wherein an ethylpolychlorobenzene starting material in a liquid form is chlorinated by passing the same and molecular chlorine through a reaction zone and in contact with adsorbent carbon. By carrying out the chlorination of the ethyl side-chain of ethylpolychlorobenzenes in the manner described herein, it has now been found that the resulting chlorination product is unexpectedly free of $\beta,\beta$-dichloroethylpolychlorobenzenes.

The method of the invention can advantageously be employed with any ethylpolychlorobenzene compound or mixture of ethylpolychlorobenzenes, i.e. nuclear chloroderivatives of ethylbenzene containing two or more chlorine atoms substituted on any of the available positions of the benzene ring. Specific examples of such ethylpolychlorobenzene starting materials are 2,3-dichloroethylbenzene
2,4-dichloroethylbenzene
2,5-dichloroethybenzene
2,6-dichloroethylbenzene
3,4-dichloroethylbenzene
3,5-dichloroethylbenzene
2,3,4-trichloroethylbenzene
2,3,5-trichloroethylbenzene
2,3,6-trichloroethylbenzene
2,4,5-trichloroethylbenzene
2,4,6-trichloroethylbenzene
3,4,5-trichloroethylbenzene and mixtures thereof.

In practice of the invention, a permeable bed of adsorbent carbon is provided in a reaction zone, such as a vertically disposed column packed with small pieces of such adsorbent carbon. Suitable adsorbent carbons include, for example, vegetable, animal, or mineral charcoals such as hardwood charcoal, coconut charcoal, fruitstone charcoal, bone char, or petroleum coke. To the reaction zone are fed a liquid stream of the organic starting material and a fluid stream of molecular chlorine in either liquid or gaseous form in a manner such that the feed materials and the resulting reaction mixture are in contact with the permeable bed of adsorbent carbon. The starting materials can be fed in streams that pass either concurrently or countercurrently through the reaction zone in contact with adsorbent carbon. Preferably the starting materials are fed at, or near, the top of a vertical column packed with charcoal, and are caused to pass downward in a non-flooding flow through the charcoal bed.

Organic starting materials that are liquid at the temperature of feeding thereof can be used per se. Solid starting materials can be put in liquid form by dispersing them into inert liquid diluents that are not readily chlorinated, such as carbon tetrachloride, or that are less readily chlorinated than the organic starting material, such as benzene or a chlorinated benzene.

The starting materials are fed at relative rates corresponding to the desired degree of chlorination. When an ethyl polychlorobenzene compound is chlorinated to make a monochloroethylpolychlorobenzene product, the starting materials are usually fed at rates corresponding to not more than one, preferably not more than 0.8, e.g. from 0.5 to 0.8, weight-mole of chlorine per weight-mole of the ethylpolychlorobenzene starting material. When an $\alpha,\beta$-dichloroethylpolychlorobenzene is the desired product, a larger proportion of chlorine can be employed, but usually not more than two, preferably not more than 1.6 e.g. from 0.8 to 1.6, weight-moles of chlorine per weight-mole of the ethylpolychlorobenzene starting material.

The reaction mixture in the reaction zone in contact with adsorbent carbon is maintained at conditions conducive to chlorination of the ethyl side-chain of the ethylpolychlorobenzene starting material, usually at temperatures between 30° C. and 150° C., depending upon the reactivity of the particular starting material. It is often desirable at least to start the reaction with some initiating means. For example, the reaction can often be initiated by heating the mixture at an elevated temperature, e.g. from 100° to 150° C. or more, or by irradiating the mixture with actinic light, or by adding to the mixture a soluble catalyst such as phosphorus pentachloride or phosphorus trichloride, or by a combination of such means. Once initiated, such reactions often continue under milder conditions, e.g. at a lower temperature, or without irradiation, or with little or no soluble catalyst. In some instances one of these aids can substitute for another. For example, the use of a soluble catalyst often permits carrying out the reaction at a lower temperature. Conversely, carrying out the reaction at a higher temperature often obviates the need for use of a soluble catalyst. Usually, somewhat higher temperatures are employed in making $\alpha,\beta$-dichloropolychlorobenzene compounds than are used in making the corresponding monochloroethylpolychlorobenzene compounds. With starting materials that are difficult to chlorinate in the side-chain, continued use of these initiating and activating aids is often necessary throughout the course of the reaction. For purposes of side-chain chlorination, it is obvious that materials that promote chlorination of the nucleus of aromatic compounds should be rigorously excluded from the reaction zone.

While the reaction can be carried out at any obtainable pressure, operation at approximately atmospheric pressure is usually preferred.

The reaction mixture effluent from the reaction zone comprises hydrogen chloride, usually some unreacted organic starting material, and the chlorinated organic derivatives resulting from the reaction. The major part of the hydrogen chloride can usually be separated as a gas from the liquid portion of the reaction product, and the liquid portion can be treated in usual ways to separate its several constituents. Usually, the liquid portion of the reaction product is treated, e.g. with alkali, to remove any hydrogen chloride, and the neutral organic liquid is subjected to fractional distillation.

As hereinbefore stated, the chlorinated products, e.g. monochloroethylpolychlorobenzenes and $\alpha,\beta$-dichloroethylpolychlorobenzenes, that are obtained from ethylpolychlorobenzene starting materials by reaction thereof with chlorine in contact with adsorbent carbon in accordance with this invention are unexpectedly free of $\beta,\beta$-dichloroethylpolychlorobenzene impurities.

The following examples illustrate the invention but are not to be construed as limiting its scope.

*Example 1*

A vertical glass reactor column one inch in diameter and 48 inches long and having a cooling-water jacket was packed with pieces of adsorbent activated vegetable charcoal having a size range such that the pieces pass a standard sieve having 4 meshes per inch and are retained on one having 10 meshes per inch. The reactor was fitted at its top with a dropping funnel for feeding 2,5-dichloroethylbenzene in liquid form and with gas line for feeding chlorine gas to the charcoal bed. A thermometer was positioned centrally in the bed. From the bottom of the reactor, the liquid portion of the reaction mixture was withdrawn to a receiver, and the gas portion of the reaction mixture was vented to waste.

Into the top of the reactor was fed a stream of 2,5-dichloroethylbenzene at an average rate of approximately 400 grams per hour and a stream of chlorine gas at an average rate of approximately 120 grams per hour. The temperature in the charcoal bed was maintained between 30° and 35° C. by means of cooling water in the surrounding jacket. The starting materials and the reaction products passed concurrently downward in non-flooding flow through the charcoal bed. The gas effluent from the bottom of the reactor was principally hydrogen chloride substantially free of unreacted chlorine and was vented to waste. The liquid effluent from the bottom of the reactor was collected in a receiver.

The liquid product that accumulated over a three-hour period had a specific gravity of 1.302 at a temperature of 25° C. The liquid organic material was neutralized by washing with several portions of sodium carbonate aqueous solution. A sample of this liquid product was analyzed by infra-red spectroscopy and was found to comprise principally $\alpha$,2,5-trichloroethylbenzene and unreacted 2,5-dichloroethylbenzene; the analysis showed no $\beta$,2,5-trichloroethylbenzene and no $\beta,\beta$,2,5-tetrachloroethylbenzene. The neutral organic liquid was fractionally distilled under vacuum. After removal of the unreacted 2,5-dichloroethylbenzene, the $\alpha$,2,5-trichloroethylbenzene was obtained in the portion of the distillate boiling between 88° and 99° C. at 2 mm. of mercury, absolute pressure, and mounted to about 59 percent by weight of the distillation charge and was entirely free of $\beta,\beta$,2,5-tetrachloroethylbenzene.

*Example 2*

Into the top of the reactor described in Example 1 was fed a stream of 2,5-dichloroethylbenzene at an average rate of approximately 250 mls. per hour and a stream of chlorine gas at an average rate of about 100 grams per hour. The temperature in the charcoal bed was maintained at approximately 100° C. by first supplying steam to the jacket to heat the bed and later by supplying water to the jacket to remove the heat of reaction. The starting materials and the reaction products thereof flowed concurrently downward in non-flooding flow through the charcoal bed. The gas effluent from the bottom of the reactor was principally hydrogen chloride substantially free of unreacted chlorine and was vented to waste. The liquid effluent from the bottom of the reactor was collected in a receiver.

The liquid product that accumulated over a four-hour period had a specific gravity of 1.32 at a temperature of 25° C. The liquid organic material was neutralized by washing with several portions of sodium carbonate aqueous solution. A sample of this neutral liquid product was analyzed by infra-red spectroscopy and was found to contain approximately 30 percent by weight $\alpha,\beta$,2,5-tetrachloroethylbenzene; the analysis showed no $\beta,\beta$,2,5-tetrachloroethylbenzene.

By fractional distillation of the neutral organic chlorination reaction product under vacuum, the $\alpha,\beta$,2,5-tetrachloroethybenzene was obtained in a fraction boiling at 115° C. at approximately 2 mm. of mercury, absolute pressure, and has a specific gravity of about 1.45 at 25° C. The $\alpha,\beta$,2,5-tetrachloroethylbenzene product was entirely free of $\beta,\beta$,2,5-tetrachloroethylbenzene.

*Example 3*

A vertical, water-jacketed column two inches in diameter and 48 inches long was fabricated of nickel and charged with 4–10 mesh adsorbent activated vegetable charcoal similar to that described in Example 1. The reaction column was also fitted with appurtenances, including feed lines and product withdrawal lines, in a manner like that described in Example 1.

Into the top of the reactor was fed a stream of 2,5-dichloroethylbenzene at an average rate of 283 grams per hour and a stream of chlorine gas at an average rate of 150 grams per hour. The temperature in the charcoal bed was maintained in the range from 100° to 120° C. The starting materials and the reaction products thereof flowed concurrently downward in non-flooding flow through the charcoal bed. The gas effluent from the bottom of the reactor was principally hydrogen chloride substantially free of unreacted chlorine and was vented to waste. The liquid effluent from the bottom of the reactor was collected in a receiver. The liquid reaction mixture collected over an 8.5-hour period was washed with aqueous 10 percent by weight sodium hydroxide solution and dried over anhydrous calcium chloride. The crude product weighed 2996 grams and had a specific gravity of 1.360 at 25° C.

The crude product was fractionally distilled under reduced pressure, whereby there were obtained distillate fractions containing 713 g. of recovered 2,5-dichloroethylbenzene, 1084 g. of monochloroethyl-2,5-dichlorobenzene, and 709 g. of α,β,2,5-tetrachloroethylbenzene. No β,β,2,5-tetrachloroethylbenzene was found in any of the distillation products.

In contrast to the tests described in the foregoing examples, 2,5-dichloroethylbenzene was chlorinated in the conventional manner. To 2412 g. of 2,5-dichloroethylbenzene containing 0.1 percent by weight of phosphorus pentachloride, there was fed a stream of chlorine gas while irradiating the reaction mixture with ultraviolet light and maintaining the temperature of the reaction mixture at approximately 35° C. After 24 hours the reaction mixture had increased in weight by 692 grams. The crude liquid reaction product was washed with dilute aqueous sodium hydroxide, and dried over anhydrous calcium chloride. The specific gravity of the washed dried product was approximately 1.43 at 25° C.

Of this crude chlorinated product, 2796 grams was subjected to fractional distillation under reduced pressure, whereby there were obtained distillate fractions containing 875 g. of monochloroethyl-2,5-dichlorobenzene, 305 g. of β,β,2,5-tetrachloroethylbenzene, and 1186 g. of α,β,2,5-tetrachloroethylbenzene; some of the β,β,2,5-tetrachloroethylbenzene was found in the lower-boiling monochloroethyl-2,5-dichlorobenzene fractions, and some of the β,β,2,5-tetrachloroethylbenzene was found in the higher-boiling α,β,2,5-tetrachloroethylbenzene fractions. It was extremely difficult, if not impossible, to obtain monochloroethyl-2,5-dichlorobenzene and/or α,β,2,5-tetrachloroethylbenzene products free of contamination by β,β,2,5-tetrachloroethylbenzene by chlorination of 2,5-dichloroethylbenzene by the conventional processes.

*Example 4*

A vertical water-jacketed glass column four inches in diameter and 30 inches long was packed with adsorbent activated vegetable charcoal similar to that described in Example 1. The reactor column was fitted with appurtenances, including feed lines and product withdrawal lines, in a manner like that described in Example 1.

Into the top of the reactor was fed a stream of an ar,ar-dichloroethylbenzene mixture. The starting material was obtained by fractional distillation of the product of nuclear chlorination of ethylbenzene, and contained about 45 percent by weight of the 2,4-dichloroethylbenzene isomer, about 30 percent of the 2,5-dichloroethylbenzene isomer, and lesser proportions of the isomeric 2,3-dichloroethylbenzene, 2,6-dichloroethylbenzene, and 3,4-dichloroethylbenzene. The specific gravity of the starting material was about 1.21 at 25° C.

The liquid mixture of ar,ar-dichloro-ethylbenzenes was fed into the top of the reactor in a continuous stream at an average rate of about four pounds per hour. Chlorine gas was fed into the top of the reactor column at a substantially constant rate such that the specific gravity of the effluent liquid reaction product was in the order of from 1.270 to 1.300 at 25° C. To initiate the reaction when the process was started, the column was heated by means of hot water in the jacket to a temperature of about 100° C., about 15 grams of phosphorus pentachloride was placed in the top of the column and feeding of the ar,ar-dichloroethylbenzene and chlorine starting materials was begun. Once initiated, the reaction was maintained by keeping the temperature of the reactor between about 100° and about 150° C. without further addition of phosphorus pentachloride.

The starting materials and the reaction products passed concurrently downward in non-flooding flow through the charcoal bed. The gas effluent from the bottom of the reactor was principally hydrogen chloride substantially free of unreacted chlorine and was vented to waste. The liquid effluent from the bottom of the reactor was collected in a receiver.

The liquid reaction product was neutralized by washing with several portions of sodium carbonate aqueous solution and was dried.

The neutral organic liquid reaction product was fractionally distilled in batches of 175 pounds. There were thereby obtained from each of such batches a distillate fraction containing 96 pounds of unreacted mixed ar,ar-dichloroethylbenzenes suitable for reuse, another distillate fraction weighing 56 pounds and containing mixed α,ar,ar-trichloroethylbenzene isomers, and another fraction containing about 8 pounds of mixed β,ar,ar-trichloroethylbenzene isomers, the residue being α,β,2,5-tetrachloroethylbenzene and higher chlorinated derivatives. No β,β-dichloroethyl-derivatives were found in the reaction product or in any of the distillation products.

In contrast to these results, when the mixture of ar,ar-dichloroethylbenzene isomers was chlorinated to approximately the same extent as above but in the usual way, i.e. by bubbling chlorine gas into a liquid body of the mixed isomers containing phosphorus pentachloride catalyst and irradiated with ultraviolet light, about ten percent by weight of the resulting reaction product was β,β,ar,ar-tetrachloroethylbenzenes. Because of the many different compounds and isomers present in this reaction mixture, it was impossible in a practical manner to obtain from such mixture the monochloroethyldichlorobenzene product or the α,β-dichloroethyldichlorobenzene product in a form free of contamination by the β,β-dichloroethyldichlorobenzene by-products.

In place of the ethyldichlorobenzene materials used in the foregoing examples of the invention, there can be used any one or a mixture of the isomeric ethyldichlorobenzene compounds, any one or a mixture of the isomeric ethyltrichlorobenzene compounds, or other ethylpolychlorobenzene compounds with substantially similar results, i.e. to obtain a side-chain chlorination product that is substantially free of contamination by the β,β-dichloroethylpolychlorobenzene by-products.

This application is a continuation-in-part of a copending patent application, Serial No. 560,074, filed January 19, 1956, by Robert R. Dreisbach and Roger F. Monroe, and now abandoned.

That which is claimed is:

1. In a method of chlorination wherein molecular chlorine and an ethylpolychlorobenzene starting material are interacted to form a side-chain chlorinated ethylpolychlorobenzene, the improvement that comprises feeding a fluid stream of chlorine and a liquid stream of the ethylpolychlorobenzene starting material to an upper part of an elongated and vertically disposed reaction zone containing a permeable bed of adsorbent carbon, the relative rates of feeding such streams corresponding to from 0.5 to 2 weight-moles of chlorine per weight-mole of ethylpolychlorobenzene compound, intermingling the starting materials and passing the resulting mixture and the products of chemical interaction thereof downward in non-flooding flow through the permeable bed of adsorbent carbon, contacting the reaction mixture with the adsorbent carbon at reaction temperatures in the range from 30° to 150° C. to obtain chemical interaction of the starting materials in contact with the adsorbent carbon, and withdrawing from the lower part of the reaction zone a reaction mixture wherein the organic product of interaction of the starting materials comprises at least one side-chain chlorinated ethylpolychlorobenzene compound and is substantially free of any β,β-dichloroethylpolychlorobenzene compound.

2. The improvement according to claim 1 wherein the ethylpolychlorobenzene starting material comprises at least one ethyldichlorobenzene compound.

3. In a method of chlorination wherein molecular chlorine and an ethyldichlorobenzene are interacted in a reaction zone under conditions conducive to chlorination of the ethyl side-chain of the starting ethyldichlorobenzene compound, the improvement that comprises feeding a fluid stream of chlorine and a liquid stream comprising at least one ethyldichlorobenzene compound to an upper part of an elongated and vertically disposed reaction zone containing a permeable bed of adsorbent charcoal, the relative rates of feeding such streams corresponding to from 0.5 to 0.8 weight-mole of chlorine per weight-mole of ethyldichlorobenzene compound, intermingling the starting materials and passing the resulting mixture and the products of chemical interaction thereof concurrently downward in non-flooding flow through the permeable bed of adsorbent charcoal, contacting the reaction mixture with the adsorbent charcoal at reaction temperatures in the range from 30° to 150° C. to obtain chemical interaction of the starting materials in contact with the adsorbent charcoal, and withdrawing from the lower part of the reaction zone a reaction mixture wherein the organic product of interaction of the starting materials comprises at least one monochloroethyldichlorobenzene and is substantially free of any $\beta,\beta$-dichloroethyldichlorobenzene.

4. The improvement according to claim 3 wherein the starting ethyldichlorobenzene consists essentially of 2,5-dichloroethylbenzene.

5. The improvement according to claim 3 wherein the starting ethyldichlorobenzene consists essentially of a mixture of isomeric ethyldichlorobenzene compounds, and wherein the reaction is catalytically activated by a phosphorus chloride at reaction temperatures in the range from 30° to 100° C.

6. In a method of chlorination wherein molecular chlorine and an ethyldichlorobenzene are interacted in a reaction zone under conditions conducive to chlorination of the ethyl side-chain of the starting ethyldichlorobenzene compound, the improvement that comprises feeding a fluid stream of chlorine and a liquid stream comprising at least one ethyldichlorobenzene compound to an upper part of an elongated and vertically disposed reaction zone containing a permeable bed of adsorbent charcoal, the relative rates of feeding such streams corresponding to from 0.8 to 1.6 weight-moles of chlorine per weight-mole of ethyldichlorobenzene compound, intermingling the starting materials and passing the resulting mixture and the products of chemical interaction thereof concurrently downward in non-flooding flow through the permeable bed of adsorbent charcoal, contacting the mixture of starting materials with the adsorbent charcoal at reaction temperatures in the range from 30° to 150° C. to obtain chemical interaction of the starting materials in contact with the adsorbent charcoal, and withdrawing from the lower part of the reaction zone a reaction mixture wherein the organic product of interaction of the starting materials comprises at least one $\alpha,\beta$-dichloroethyldichlorobenzene and is substantially free of any $\beta,\beta$-dichloroethyldichlorobenzene.

7. The improvement according to claim 6 wherein the starting ethyldichlorobenzene consists essentially of 2,5-dichloroethylbenzene.

8. The improvement according to claim 6 wherein the starting ethyldichlorobenzene consists essentially of a mixture of isomeric ethyldichlorobenzene compounds, and wherein the reaction is catalytically activated by a phosphorus chloride at reaction temperatures in the range from 30° to 100° C.

References Cited in the file of this patent
UNITED STATES PATENTS

| | | |
|---|---|---|
| 2,290,758 | Levine et al. | July 21, 1942 |
| 2,290,759 | Levine et al. | July 21, 1942 |
| 2,602,823 | Ross et al. | July 8, 1952 |

OTHER REFERENCES

Huntress: "Organic Chlorine Compounds," pp. 1194-5 (1948).

Groggins: "Unit Processes in Organic Synthesis," fourth edition, pp. 237-8 (1952).